(12) United States Patent
Senshiki

(10) Patent No.: US 11,997,435 B2
(45) Date of Patent: May 28, 2024

(54) DISPLAY METHOD AND DISPLAY SYSTEM

(71) Applicant: SEIKO EPSON CORPORATION, Tokyo (JP)

(72) Inventor: Hiroki Senshiki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/335,178

(22) Filed: Jun. 15, 2023

(65) Prior Publication Data

US 2023/0412783 A1 Dec. 21, 2023

(30) Foreign Application Priority Data

Jun. 17, 2022 (JP) ................................. 2022-097869

(51) Int. Cl.
| | |
|---|---|
| *H04N 9/31* | (2006.01) |
| *G03B 33/08* | (2006.01) |
| *G06F 3/041* | (2006.01) |
| *G06F 3/042* | (2006.01) |
| *G06F 3/0488* | (2022.01) |

(52) U.S. Cl.
CPC ........... *H04N 9/3194* (2013.01); *G03B 33/08* (2013.01); *G06F 3/04186* (2019.05); *G06F 3/0421* (2013.01); *G06F 3/0488* (2013.01); *H04N 9/3147* (2013.01); *G06F 2203/04106* (2013.01); *G06F 2203/048* (2013.01)

(58) Field of Classification Search
CPC .. G06F 3/04186; G06F 3/0488; G06F 3/0421; G06F 2203/04106; G06F 2203/048; H04N 9/3194; H04N 9/3147; G03B 33/08
See application file for complete search history.

(56) References Cited

U.S. PATENT DOCUMENTS

| | | | | |
|---|---|---|---|---|
| 9,709,878 B2* | 7/2017 | Izukawa | .............. | H04N 9/3194 |
| 10,120,111 B2* | 11/2018 | Berger | ................. | C03C 17/007 |
| 2012/0140319 A1* | 6/2012 | Moribe | ................. | G06F 3/0425 |
| | | | | 359/460 |
| 2013/0342493 A1* | 12/2013 | Crow | .................... | G06F 3/0425 |
| | | | | 345/173 |

(Continued)

FOREIGN PATENT DOCUMENTS

| | | |
|---|---|---|
| JP | 2015-088060 A | 5/2015 |
| JP | 2017-138871 A | 8/2017 |

*Primary Examiner* — Doon Y Chow
(74) *Attorney, Agent, or Firm* — Dority & Manning, P.A.

(57) ABSTRACT

A projector includes a first acquisition unit, a second acquisition unit, a first determination unit, and a display control unit. The first acquisition unit sequentially acquires a first captured image and a second captured image on a display surface. The second acquisition unit acquires a first brightness value and a first position of a bright point contained in the first captured image and a second brightness value and a second position of a bright point contained in the second captured image. The first determination unit determines whether the second brightness value is larger than the first brightness value by a first threshold or more and the second position is closer to a camera than the first position. The display control unit displays a display image containing a drawn image showing a drawn line by a pointer when a determination result is negative, and displays a display image not containing the drawn image when the determination result is positive.

6 Claims, 4 Drawing Sheets

(56) References Cited

U.S. PATENT DOCUMENTS

2015/0116276 A1    4/2015    Izukawa et al.
2015/0261374 A1*  9/2015    Eguchi .................. G06F 3/0416
                                                  345/173

\* cited by examiner

DISPLAY METHOD AND DISPLAY SYSTEM

The present application is based on, and claims priority from JP Application Serial Number 2022-097869, filed Jun. 17, 2022, the disclosure of which is hereby incorporated by reference herein in its entirety.

BACKGROUND

1. Technical Field

The present disclosure relates to a display method and a display system.

2. Related Art

In an interactive projector, when an operation to draw a line forming a character or a figure is performed by touching a display surface for image display with a pointer including a finger, an image of the drawn line according to the operation is displayed. The touch on the display surface refers to a state in which a distance between the tip of the pointer and the display surface is equal to or smaller than a predetermined threshold, but is not limited to a state in which the tip of the pointer actually contacts the display surface. An example of the interactive projector includes a projector detecting a touch with the pointer by imaging bright points generated when the pointer crosses a light such as an IR (infraRed) light radiated along the display surface for detection of the touch using a camera. The light radiated along the display surface is called a light curtain and a radiation apparatus radiating the light curtain is called a light curtain unit or a finger touch unit. JP-A-2015-88060 discloses a technique of detecting a touch on a display surface such as a screen when a reflected light by an operation tool such as a pointer is detected and a peak value of an amount of the reflected light stops changing.

According to the technique disclosed in JP-A-2015-88060, the peak value may fluctuate even when the pointer touches the display surface due to a change of the reflected light from the display surface or a change of the irradiation of the pointer with the light, the touch of the pointer on the display surface may be falsely detected.

SUMMARY

A display method according to an aspect of the present disclosure includes acquiring a first captured image by using a camera imaging a range containing a display surface, acquiring a second captured image by imaging the range containing the display surface using the camera after acquiring the first captured image, acquiring a first brightness value indicating brightness of a first bright point contained in the first captured image by a reflected light from a pointer for drawing a line on the display surface, and a first position indicating coordinates of the first bright point in the first captured image, acquiring a second brightness value indicating brightness of a second bright point contained in the second captured image by a reflected light from the pointer, and a second position indicating coordinates of the second bright point in the second captured image, displaying a first display image not containing a drawn image showing the line by the pointer on the display surface in a third position corresponding to the second position in an image displayed on the display surface when a first condition that the second brightness value is larger than the first brightness value by a first threshold or more and the second position is a position closer to the camera than the first position is satisfied, and displaying a second display image containing the drawn image in the third position on the display surface when the first condition is not satisfied.

A display system according to an aspect of the present disclosure includes a camera imaging a range containing a display surface, and a display apparatus executing acquiring a first captured image by imaging the range using the camera, acquiring a second captured image by imaging the range using the camera after acquiring the first captured image, acquiring a first brightness value indicating brightness of a first bright point contained in the first captured image by a reflected light from a pointer for drawing a line on the display surface, and a first position indicating coordinates of the first bright point in the first captured image, acquiring a second brightness value indicating brightness of a second bright point contained in the second captured image by a reflected light from the pointer, and a second position indicating coordinates of the second bright point in the second captured image, displaying a first display image not containing a drawn image showing the line by the pointer on the display surface in a third position corresponding to the second position in an image displayed on the display surface when a first condition that the second brightness value is larger than the first brightness value by a first threshold or more and the second position is a position closer to the camera than the first position is satisfied, and displaying a second display image containing the drawn image in the third position on the display surface when the first condition is not satisfied.

DESCRIPTION OF EXEMPLARY EMBODIMENTS

As below, technically preferable various limitations are added to the following embodiments. However, the embodiments of the present disclosure are not limited to the following configurations.

1. EMBODIMENT

Figure 1:
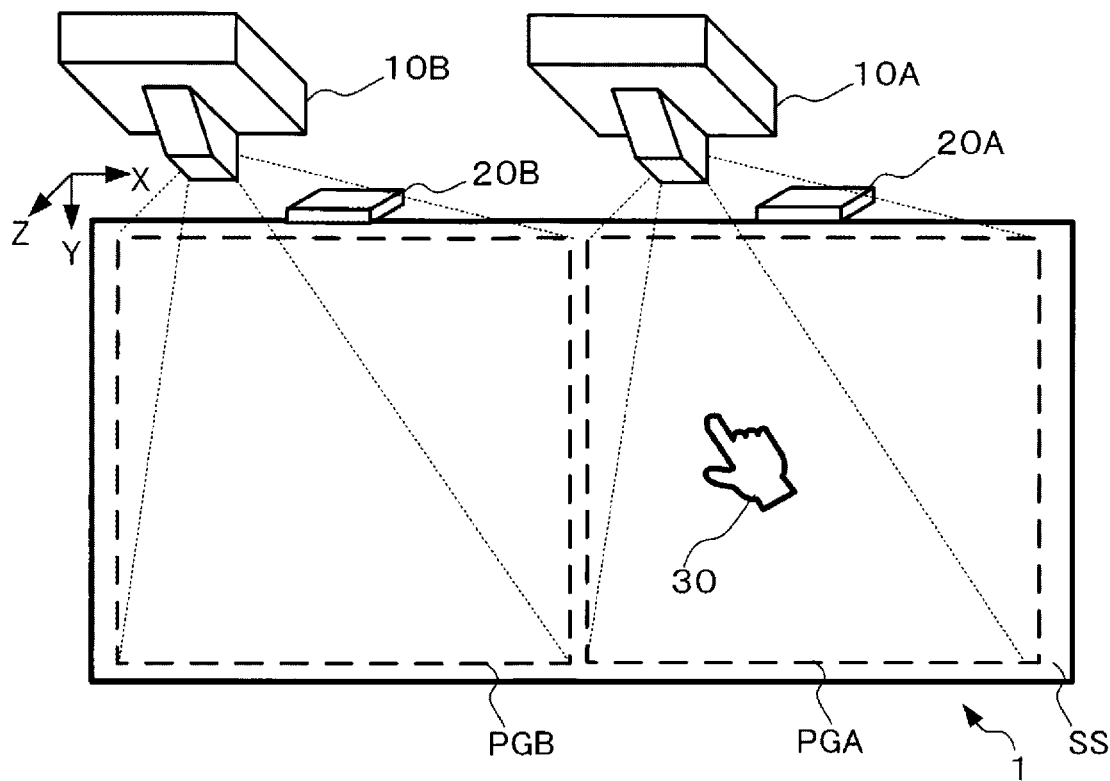
FIG. 1 shows a configuration example of a display system according to an embodiment of the present disclosure.

FIG. 1 shows a configuration example of a display system 1 according to one embodiment of the present disclosure.

The display system 1 includes a projector 10A, a projector 10B, a radiation apparatus 20A and a radiation apparatus 20B. An image supply apparatus (not shown) is coupled to the projector 10A and the projector 10B by wired or wireless connection. The projector 10A displays a display image PGA according to image data shared from the image supply apparatus (not shown) on a display surface SS such as a projection screen. Similarly, the projector 10B displays a display image PGB according to image data shared from the image supply apparatus (not shown) on the display surface SS. The projector 10A and the projector 10B are placed on a ceiling of a room in which the display surface SS is placed. The image data respectively supplied from the image supply apparatus to the projector 10A and the projector 10B includes image data representing materials in a conference or the like or image data representing educational materials in a school or the like. A specific example of the image supply apparatus includes e.g., a personal computer.

When a user brings a pointer 30 close to the display surface SS and makes a motion to draw a character or a figure, the projector 10A displays the display image PGA containing a drawn image showing a drawn line of the user on the display surface SS. The display image PGA is an image formed by superimposition of the drawn image showing the drawn line of the user on the image represented by the image data shared from the image supply apparatus. The pointer 30 in the embodiment is a finger of the user, but may be a touch pen. Similarly, when the user brings the pointer 30 close to the display surface SS and makes a motion to draw a character or a figure, the projector 10B displays the display image PGB containing a drawn image showing a drawn line of the user on the display surface SS. Also, the display image PGB is an image formed by superimposition of the drawn image showing the drawn line of the user on the image represented by the image data shared from the image supply apparatus. That is, the projector 10A and the projector 10B are interactive projectors. Hereinafter, when it is not necessary to distinguish the projector 10A and the projector 10B, the projector 10A and the projector 10B are referred to as "projector 10". Note that, hereinafter, as shown in FIG. 1, a coordinate axis along the normal of the display surface SS is referred to as "Z-axis", a coordinate axis along the vertical direction is referred to as "Y-axis", and a coordinate axis orthogonal to the Y-axis and the Z-axis is referred to as "X-axis".

The radiation apparatus 20A is a finger touch unit forming a pair with the projector 10A. The radiation apparatus 20B is a finger touch unit forming a pair with the projector 10B. As shown in FIG. 1, the radiation apparatus 20A and the radiation apparatus 20B are placed in line in the X-axis directions above the display surface SS. The radiation apparatus 20A and the radiation apparatus include IR light sources emitting IR lights. The respective radiation apparatus 20A and radiation apparatus radiate the IR lights forming light curtains along the display surface SS. When the user brings the pointer 30 close to the display surface SS for drawing a character or a figure and the pointer 30 crosses the light curtain, a reflected light of the light curtain by the pointer 30 is generated. Under the condition, an image in a predetermined range containing the display surface SS is captured by a camera, and bright points corresponding to the reflected light of the light curtain by the pointer 30 appear in the image. In the display system 1, the trajectory of the bright points is followed, and thereby, the drawn line drawn by the user is detected using the pointer 30.

Figure 2:
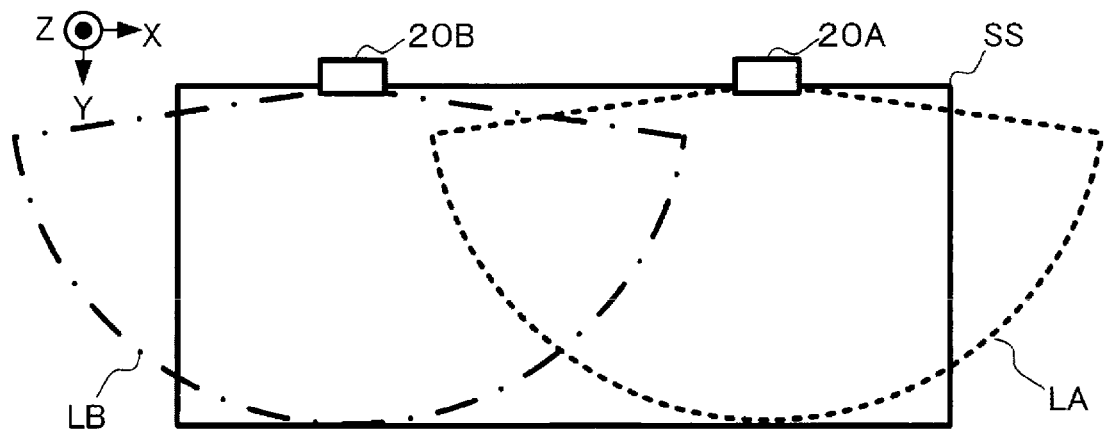
FIG. 2 is a diagram for explanation of IR lights radiated from respective radiation apparatuses for detection of a position of a pointer in the display system.
Figure 3:
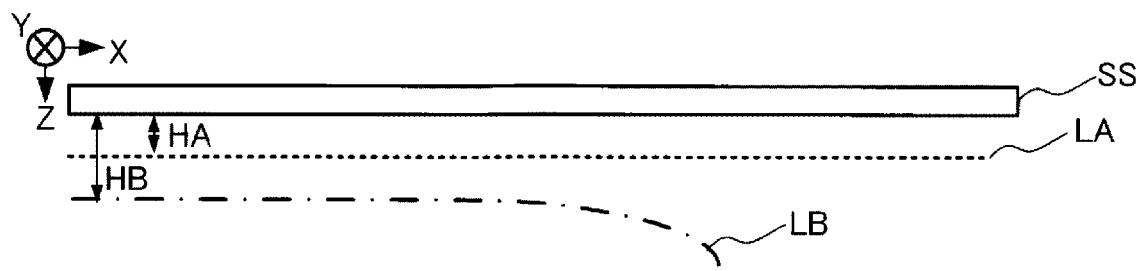
FIG. 3 is a diagram for explanation of IR lights radiated from the respective radiation apparatuses for detection of the position of the pointer in the display system.

FIGS. 2 and 3 are diagrams for explanation of the IR lights radiated from the respective radiation apparatus 20A and radiation apparatus 20B. FIG. 2 shows the IR lights radiated from the respective radiation apparatus 20A and radiation apparatus 20B as seen from the Z-axis direction. FIG. 3 shows the IR lights radiated from the respective radiation apparatus 20A and radiation apparatus 20B as seen from the Y-axis direction. As shown in FIGS. 2 and 3, the radiation apparatus 20A radiates an IR light LA in a sector form in a position at a distance HA apart from the display surface SS in the Z-axis direction along the display surface SS. The IR light LA is an example of a first light in the present disclosure. Similarly, the radiation apparatus 20B radiates an IR light LB in a sector form in a position at a distance HB apart from the display surface SS in the Y-axis direction along the display surface SS. The IR light LB is an example of a second light in the present disclosure.

As shown in FIGS. 2 and 3, the light curtain formed by the IR light LA and the light curtain formed by the IR light LB partially overlap with each other as seen from the Z-axis direction. It is preferable that there is no gap between the light curtain formed by the IR light LA and the light curtain formed by the IR light LB in the Z-axis direction, that is, the distance HA and the distance HB are equal. However, the distance HA and the distance HB may be different depending on a difference between initial settings or the like of the respective radiation apparatus 20A and radiation apparatus 20B. Further, the end portions of the sector-shaped light curtains tend to be curved and the distance HA and the distance HB may be different due to the curvature.

Figure 4:
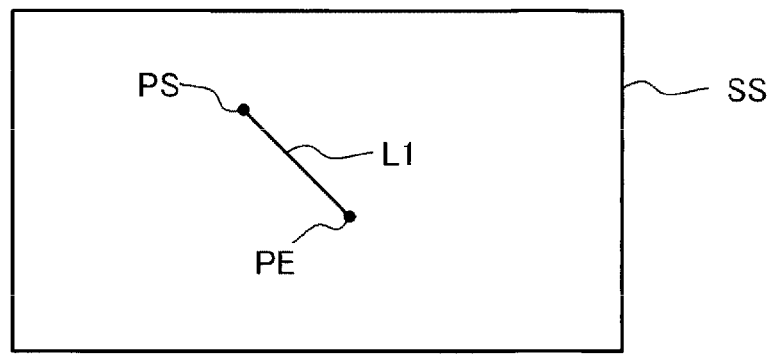
FIG. 4 shows an example of a line segment drawn using the pointer.
Figure 5:
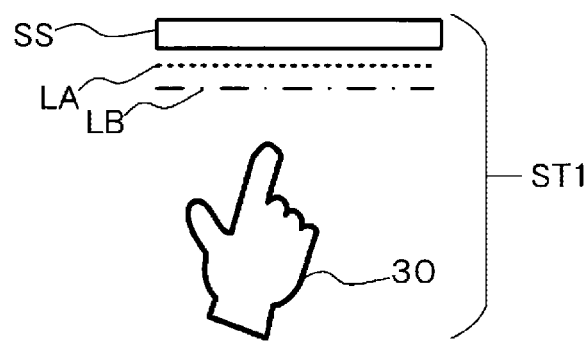
FIG. 5 is a diagram for explanation of changes in position relationship between the pointer and a display surface in a process of drawing the line segment.
Figure 5:
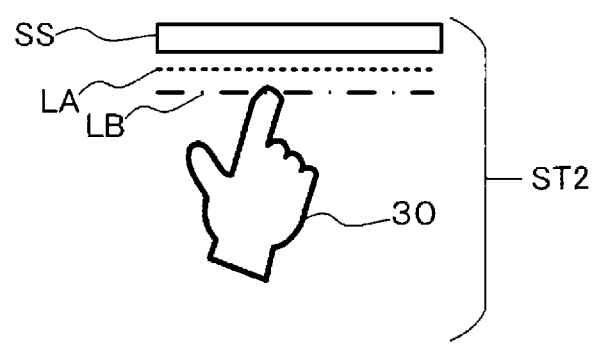
Figure 5:
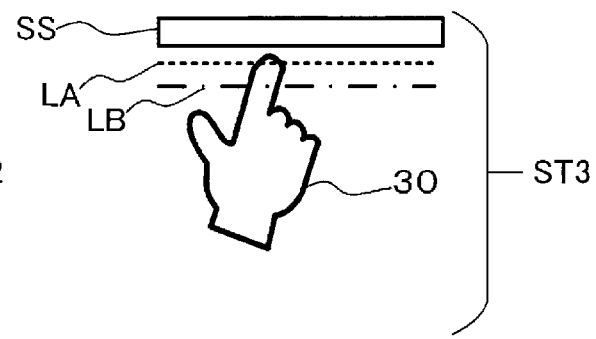

It is assumed that, under a situation in which the distance HA and the distance HB are different, a line segment L1 from a start point PS to an end point PE is drawn using the pointer 30 on the display surface SS as shown in FIG. 4. FIG. 5 is a diagram for explanation of changes in position relationship between the pointer 30 and the display surface SS in the process of drawing the line segment L1. A state ST1 in FIG. 5 is a state in which the pointer 30 is at a sufficient distance apart from the display surface SS and the bright points corresponding to the pointer 30 do not appear in the captured image of the display surface SS in the state ST1.

When the user brings the pointer 30 close to the display surface SS for drawing the line segment L1, the pointer 30 crosses the IR light LB as in a state ST2 in FIG. 5. When the user brings the pointer 30 closer to the display surface SS from the state ST2, the pointer 30 crosses the IR light LB and the IR light LA as in a state ST3 in FIG. 5. The bright points corresponding to the reflected light by the pointer 30 appear in the captured image of the display surface SS in the state ST2 or the state ST3. The user draws the line segment L1 by moving the pointer 30 along the display surface SS from the start point PS to the end point PE while keeping the pointer crossing the IR light LB and the IR light LA, i.e., the state ST3. The pointer 30 reaches the end point PE, and then, the user brings the pointer 30 away from the display surface SS, and the relationship between the pointer 30 and the display surface SS changes from the state ST3 to the state ST2 and further changes from the state ST2 to the state ST1.

Figure 6:
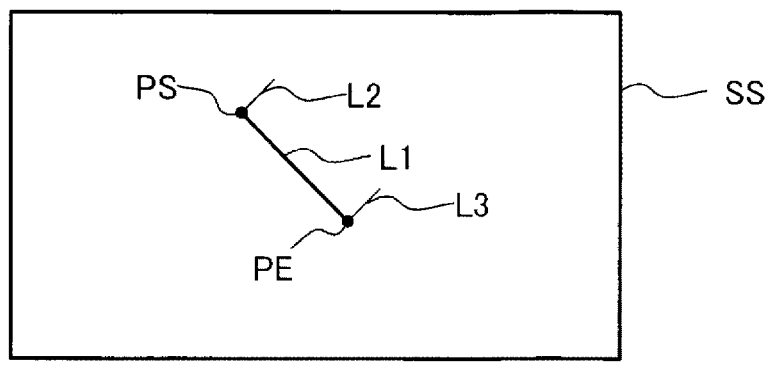
FIG. 6 is a diagram for explanation of a problem of an interactive projector in related art.

The process of the change from the state ST2 to the state ST3 corresponds to the start of drawing of the line segment L1 and the process of the change from the state ST3 to the state ST2 corresponds to the end of drawing of the line segment L1. In the process of the change from the state ST2 to the state ST3 and the process of the change from the state ST3 to the state ST2, the amount of the reflected light by the pointer 30 largely changes and the positions of the bright points corresponding to the reflected light in the captured image also change. In an interactive projector in related art, the change of the amount of reflected light and the change of the positions of the bright points are regarded as a movement of the bright points and, as shown in FIG. 6, an extra line segment L2 connecting to the start point PS and an extra line segment L3 connecting to the end point PE may be drawn. The projector 10 in the embodiment is configured not to draw extra lines at the start of drawing and the end of drawing of the line drawn using the pointer 30. The projector 10 is an example of a display apparatus in the present disclosure.

Figure 7:
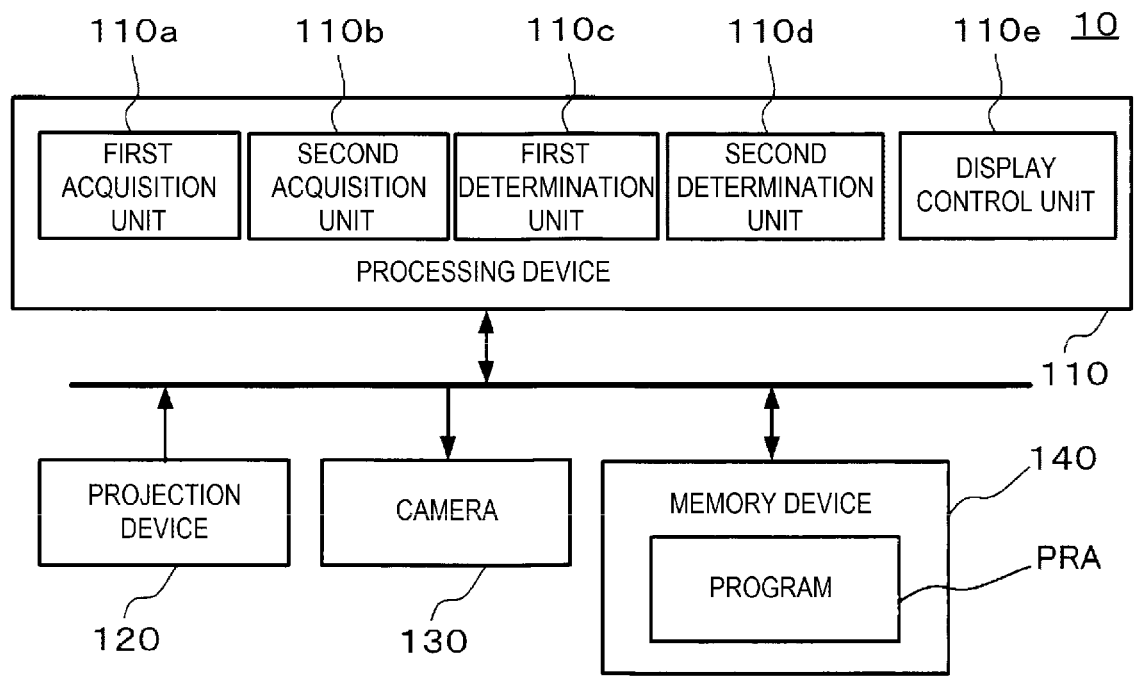
FIG. 7 shows a configuration example of a projector included in the display system.

FIG. 7 shows a configuration example of the projector 10. The projector 10 shown in FIG. 7 includes a processing device 110, a projection device 120, a camera 130, and a memory device 140. The projector 10 includes a communication circuit for communication with the image supply apparatus by wired or wireless connection and an input device such as a keyboard receiving various input operations of the user in addition to the processing device 110, the projection device 120, the camera 130, and the memory device 140. However, the communication device and the input device have little relation with the present disclosure and are omitted in FIG. 7.

The processing device 110 includes e.g., a processor such as a CPU (Central Processing Unit), i.e., a computer. The processing device 110 includes a single processor or a plurality of processors. The processing device 110 operates according to a program PRA stored in the memory device 140, and thereby, functions as a control center of the projector 10.

The projection device 120 includes a projection lens, a liquid crystal drive unit, a liquid crystal panel, and a light source unit. Note that, in FIG. 7, the illustration of the projection lens, the liquid crystal drive unit, the liquid crystal panel, and the light source unit is omitted. The liquid crystal drive unit drives the liquid crystal panel according to the image data supplied from the processing device 110, and thereby, draws a display image represented by the image data on the liquid crystal panel. The light source unit includes a light source e.g., a halogen lamp or a laser diode. The light from the light source unit is modulated with respect to each pixel in the liquid crystal panel and projected as an image light via the projection lens. The image light is projected on the display surface SS, and thereby, the display image is displayed on the display surface SS. Note that the projection device 120 may be configured to project the image light on the display surface SS and may include a digital mirror device (DMD) in place of the liquid crystal drive unit and the liquid crystal panel. The liquid crystal panel and the DMD are examples of a display panel in the present disclosure.

The camera 130 is e.g., an IR camera and the attitude thereof is adjusted to direct the optical axis toward the center of the display surface SS. The camera 130 includes e.g., a CCD (Charge Coupled Device) or a CMOS (Complementary Metal Oxide Semiconductor) as an imaging device converting a light collected by an optical system including a lens into an electrical signal. An IR light filter for receiving the IR light is attached to the camera 130. The camera 130 captures an image of a predetermined range containing the display surface SS in a predetermined cycle under control by the processing device 110. The camera 130 outputs image data representing the captured image to the processing device 110 at each time when capturing the image of the predetermined range containing the display surface SS.

The memory device 140 is a recording medium readable by the processing device 110. The memory device 140 includes e.g., a non-volatile memory and a volatile memory.

The non-volatile memory is e.g., a ROM (Read Only Memory), an EPROM (Erasable Programmable Read Only Memory), or an EEPROM (Electrically Erasable Programmable Read Only Memory). The volatile memory is e.g., a RAM (Random Access Memory).

In the non-volatile memory of the memory device 140, the program PRA for the processing device 110 to execute the display method of the present disclosure is stored in advance. Further, in the non-volatile memory, conversion data for mutual conversion between a position on the captured image captured by the camera 130 and a position on the display image displayed by the projection device 120 is stored in advance. The conversion data is appropriately generated by a known calibration and stored in the non-volatile memory. The calibration refers to processing for correlating a camera coordinate system defining the position on the captured image captured by the camera 130 and a panel coordinate system defining a position on the liquid crystal panel in the projection device 120. A specific example of the conversion data includes a transform matrix for mutual transformation between the camera coordinate system and the panel coordinate system. The volatile memory of the memory device 140 is used by the processing device 110 as a work area when the program PRA is executed. Here, the panel coordinate system when the projection device 120 includes a DMD in place of the liquid crystal panel is a coordinate system defining a position on the DMD.

The processing device 110 reads the program PRA from the non-volatile memory into the volatile memory when power of the projector 10 is turned on, and starts execution of the read program PRA. The processing device 110 operating according to the program PRA functions as a first acquisition unit 110*a*, a second acquisition unit 110*b*, a first determination unit 110*c*, a second determination unit 110*d*, and a display control unit 110*e* shown in FIG. 7. The first acquisition unit 110*a*, the second acquisition unit 110*b*, the first determination unit 110*c*, the second determination unit 110*d*, and the display control unit 110*e* shown in FIG. 7 are software modules realized by operating the processing device 110 according to the program PRA. The respective functions of the first acquisition unit 110*a*, the second acquisition unit 110*b*, the first determination unit 110*c*, the second determination unit 110*d*, and the display control unit 110*e* shown in FIG. 7 are as below.

The first acquisition unit 110*a* acquires the image data output from the camera 130 at each time when the predetermined range containing the display surface SS is imaged by the camera 130. As described above, in the embodiment, the camera 130 images the predetermined range containing the display surface SS in the predetermined cycle. That is, the first acquisition unit 110*a* acquires first image data representing a first captured image of the predetermined range containing the display surface SS and, after acquiring the first image data, acquires second image data representing a second captured image of the predetermined range containing the display surface SS.

The second acquisition unit 110*b* detects bright points corresponding to the reflected light of the light curtain by the pointer 30 from the captured image represented by the image data by analyzing the image data acquired by the first acquisition unit 110*a*. The second acquisition unit 110*b* detects an area where a predetermined number or more pixels e.g., three pixels belong and brightness of the respective pixels is a predetermined value or more as an image corresponding to the bright points. The bright point detected from the first captured image by the second acquisition unit 110*b* is an example of a first bright point in the present disclosure. The bright point detected from the second captured image by the second acquisition unit 110*b* is an example of a second bright point in the present disclosure.

The second acquisition unit 110*b* acquires a first brightness value indicating the brightness of the first bright point from the first captured image and acquires a second brightness value indicating the brightness of the second bright point from the second captured image. A specific example of the first brightness value includes an average value of brightness values of the pixels belonging to the area corresponding to the first bright point in the first captured image. A specific example of the second brightness value includes an average value of brightness values of the pixels belonging to the area corresponding to the second bright point in the second captured image. Further, the second acquisition unit 110*b* calculates a position of the gravity center of the brightness in the area corresponding to the first bright point in the first captured image, and acquires the position of the gravity center as the position of the first bright point in the first captured image. The position of the gravity center of the brightness refers to a value obtained by weighted averaging of the respective coordinate values of X-coordinates and Y-coordinates of the pixels belonging to the area corresponding to the bright point with the brightness values of the pixels as weights. The position of the first bright point in the first captured image is an example of a first position in the present disclosure. Furthermore, the second acquisition unit 110*b* calculates a position of the gravity center of the brightness in the area corresponding to the second bright point in the second captured image, and acquires the position of the gravity center as the position of the second bright point in the second captured image. The position of the second bright point in the second captured image is an example of a second position in the present disclosure. Note that, to increase stability in bright point detection, the second acquisition unit 110*b* may detect the bright points after removing a background image obtained by imaging of the display surface SS in the state ST1 from the captured image.

The first determination unit 110*c* determines whether the second brightness value and the second position satisfy the following first condition. The first condition is a condition that the second brightness value is larger than the first brightness value by a first threshold or more and the second position is a position closer to the camera 130 than the first position. The second position being a position closer to the camera 130 than the first position refers to a state in which a distance between a reference position corresponding to the position of the camera 130 in the panel coordinate system and a third position corresponding to the second position in the panel coordinate system is shorter than a distance between the reference position and a fourth position corresponding to the first position in the panel coordinate system. Note that the reference position may be acquired in the process of the above described calibration. Specifically, the above described conversion data is generated based on positions of respective patterns shown by a pattern image contained in a third captured image obtained by projection of the pattern image for correlating the camera coordinate system with the panel coordinate system from the projection device 120 on the display surface SS and imaging of a predetermined area containing the pattern image using the camera 130. Then, the reference position is acquired by projection of the center of the imaging lens of the camera 130 on the display surface SS using the conversion data. The third position is acquired by conversion of the second position into the position in the panel coordinate system using the conversion data. The fourth position is acquired by conversion of the first position into the position in the panel coordinate system using the conversion data.

Figure 8:
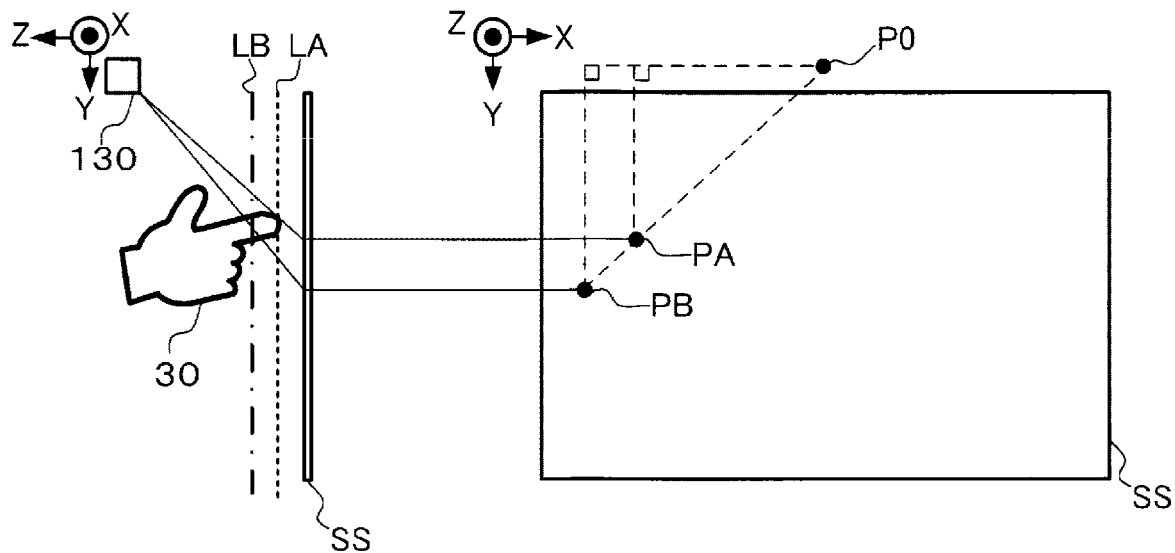
FIG. 8 is a diagram for explanation of a position relationship among bright points and a reference position.

FIG. 8 is a diagram for explanation of a position relationship among a bright point PA formed by the pointer 30 reflecting the IR light LA in the above described state ST3, a bright point PB formed by the pointer 30 reflecting the IR light LB, and a reference position P0. Note that, when the difference between the distance HA and the distance HB is sufficiently large, generally, the bright point PA and the bright point PB appear as the respective separate two bright points in the captured image and, as shown in FIG. 8, the position of the bright point PB is a position on a straight line connecting the reference position P0 and the position of the bright point PA. When the difference between the distance HA and the distance HB is not sufficiently large, the bright point PA and the bright point PB integrally appear as a single bright point and the brightness is higher than the brightness of the bright point PB alone and the position thereof is between the bright point PA and the bright point PB. The fluctuation range of the brightness of the bright point by the user moving the pointer 30 along the display surface SS in the state ST3 is about 20% to 30%.

In the captured image in the above described state ST2, only the bright point PB appears. When the state ST2 changes to the state ST3, the fluctuation range of the brightness of the bright point is larger than the fluctuation range of the brightness of the bright point by the user moving the pointer 30 along the display surface SS in the state ST3. In the embodiment, the first threshold is set to a value larger than the fluctuation range of the brightness by the user moving the pointer 30 along the display surface SS in the state ST3. Therefore, the satisfaction of the first condition by the second brightness value and the second position refers to a process of transition from the state ST2 to the state ST3. That is, the first determination unit 110*c* is provided for determination as to whether the state ST2 is transitioning to the state ST3.

The second determination unit 110*d* determines whether the second brightness value and the second position satisfy the following second condition. The second condition is a condition that the first brightness value is larger than the second brightness value by a second threshold or more and the second position is a position farther from the camera 130 than the first position. The second threshold in the embodiment is the same value as the first threshold. Note that the second threshold may be a different value from the first threshold as long as the value may be larger than the fluctuation range of the brightness by the user moving the pointer 30 along the display surface SS in the state ST3. The second position being a position farther from the camera 130 than the first position refers to a state in which a distance between the reference position and the above described third position is longer than a distance between the reference position and the above described fourth position. The satisfaction of the second condition refers to a process of transition from the state ST3 to the state ST2. That is, the second determination unit 110*d* is provided for determination as to whether the state ST3 is transitioning to the state ST2.

The display control unit 110*e* performs display control of the drawn image showing the drawn line by the pointer 30. In the embodiment, when the determination result by the first determination unit 110*c* is negative and the determination result by the second determination unit 110*d* is negative, the display control unit 110*e* generates image data representing the first display image in which the drawn image is placed in the above described third position and provides the data to the projection device 120. On the other hand, when the determination result by the first determination unit 110c is positive or the determination result by the second determination unit 110d is positive, the display control unit 110e generates image data representing the second display image in which the drawn image is not placed in the above described third position and provides the data to the projection device 120. The positive determination result by the first determination unit 110c refers to a process of transition from the state ST2 to the state ST3, and the positive determination result by the second determination unit 110d refers to a process of transition from the state ST3 to the state ST2. In the embodiment, in the process of transition from the state ST2 to the state ST3 and the process of transition from the state ST3 to the state ST2, the drawn image showing the drawn line by the pointer 30 is not displayed. Accordingly, at the start of drawing and the end of drawing of the line drawn using the pointer 30, extra lines, i.e., the line segment L2 and the line segment L3 in FIG. 6 are not displayed.

Figure 9:
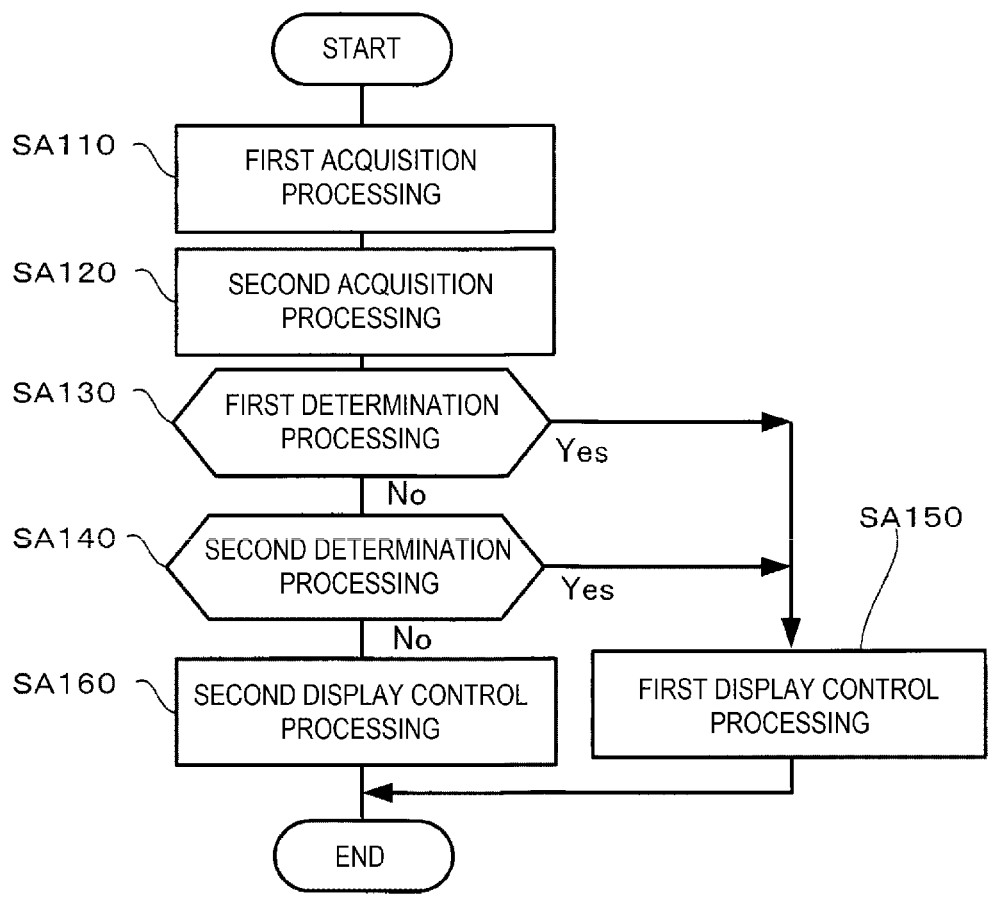
FIG. 9 is a flowchart showing a flow of a display method executed by a processing device according to a program.

The processing device 110 operating according to the program PRA repeatedly executes the display method shown in FIG. 9 in a fixed cycle. As shown in FIG. 9, the display method of the embodiment includes first acquisition processing SA110, second acquisition processing SA120, first determination processing SA130, second determination processing SA140, first display control processing SA150, and second display control processing SA160.

In the first acquisition processing SA110, the processing device 110 functions as the first acquisition unit 110a. In the first acquisition processing SA110, the processing device 110 acquires the first image data representing the first captured image and, after acquiring the first image data, acquires the second image data representing the second captured image.

In the second acquisition processing SA120, the processing device 110 functions as the second acquisition unit 110b. In the second acquisition processing SA120, the processing device 110 acquires the first brightness value and the first position by analyzing the first image data. Further, in the acquisition processing SA120, the processing device 110 acquires the second brightness value and the second position by analyzing the second image data.

In the first determination processing SA130, the processing device 110 functions as the first determination unit 110c. In the first determination processing SA130, the processing device 110 determines whether the second brightness value and the second position satisfy the first condition. When the second brightness value and the second position satisfy the first condition, the determination result of the first determination processing SA130 is "Yes", positive. When the determination result of the first determination processing SA130 is positive, the processing device 110 executes the first display control processing SA150 and ends the display method. When the second brightness value and the second position do not satisfy the first condition, the determination result of the first determination processing SA130 is "No", negative. When the determination result of the first determination processing SA130 is negative, the processing device 110 executes the second determination processing SA140.

In the second determination processing SA140, the processing device 110 functions as the second determination unit 110d. In the second determination processing SA140, the processing device 110 determines whether the second brightness value and the second position satisfy the second condition. When the second brightness value and the second position satisfy the second condition, the determination result of the second determination processing SA140 is "Yes", positive. When the determination result of the second determination processing SA140 is positive, the processing device 110 executes the first display control processing SA150 and ends the display method. When the second brightness value and the second position do not satisfy the second condition, the determination result of the second determination processing SA140 is "No", negative. When the determination result of the second determination processing SA140 is negative, the processing device 110 executes the second display control processing SA160 and ends the display method.

In the first display control processing SA150 and the second display control processing SA160, the processing device 110 functions as the display control unit 110e. In the first display control processing SA150, the processing device 110 generates image data representing the first display image not containing the drawn image in the third position and provides the data to the projection device 120. In the second display control processing SA160, the processing device 110 generates image data representing the second display image containing the drawn image in the third position and provides the data to the projection device 120.

In the embodiment, whether the start of the line or the end of the line is determined based on the magnitude of the change in position of the bright point in addition to the magnitude of the change in brightness of the bright point. Therefore, according to the projector 10 of the embodiment, compared to the technique disclosed in JP-A-2015-88060, the touch by the pointer 30 on the display surface SS may be detected more accurately and display of extra lines at the start of drawing and the end of the drawing of the line drawn using the pointer 30 is avoided.

2. MODIFICATIONS

The above described embodiment may be modified as below.

(1) When display of an extra line at the end point of the drawn line is not problematic, the second determination processing SA140 may be omitted. In the display method without the second determination processing SA140, when the determination result of the first determination processing SA130 is negative, the second display control processing SA160 is executed. Note that, when display of an extra line at the start point of the drawn line is not problematic, the first determination processing SA130 may be omitted and, in this case, the second determination processing SA140 may be executed subsequent to the second acquisition processing SA120. Further, the display method of the present disclosure may include processing of acquiring the reference position, more specifically, a calibration. In the above described embodiment, whether the first condition is satisfied and whether the second condition is satisfied are determined based on the position of the first bright point, the position of the second bright point, and the position corresponding to the camera 130 in the panel coordinate system. However, whether the first condition is satisfied and whether the second condition is satisfied may be determined based on the position of the first bright point, the position of the second bright point, and the position corresponding to the camera 130 in the camera coordinate system. This is because the position relationship among the position of the first bright point, the position of the second bright point, and the position corresponding to the camera 130 is the same regardless of whether the panel coordinate system or the camera coordinate system is used.

(2) The camera 130 is included in the projector 10 in the above described embodiment, however, the camera 130 may be separately provided, not included in the projector 10. The above described embodiment is an application example of the present disclosure to the projector, however, the present disclosure may be applied to a flat panel display, not limited to the projector. That is, the present disclosure can be applied to any display apparatus displaying an image according to a drawing operation on the display surface by the user. Here, the panel coordinate system when the flat panel display is used in place of the projector 10 is a coordinate system defining a position on a display panel on which the flat panel display displays an image.

(3) The first acquisition unit 110a, the second acquisition unit 110b, the first determination unit 110c, the second determination unit 110d, and the display control unit 110e in the above described embodiment are the software modules. However, any one or more or all of the first acquisition unit 110a, the second acquisition unit 110b, the first determination unit 110c, the second determination unit 110d, and the display control unit 110e may be hardware modules such as ASICs (Application Specific Integrated Circuits). Even when any one or more or all of the first acquisition unit 110a, the second acquisition unit 110b, the first determination unit 110c, the second determination unit 110d, and the display control unit 110e may be hardware modules, the same effects as those of the above described embodiment are exerted.

(4) The program PRA may be manufactured singly, or provided with or without charge. Specific forms for providing the program PRA include a form in which the program PRA is written and provided in a computer-readable recording medium such as a flash ROM and a form in which the program PRA is downloaded via an electrical communication line such as the Internet. A general computer is operated according to the program PRA provided in these forms, and thereby, the computer can execute the display method of the present disclosure.

3. SUMMARY OF PRESENT DISCLOSURE

The present disclosure is not limited to the above described embodiment and modified examples, but may be realized in various aspects without departing from the scope thereof. For example, the present disclosure can be realized by the following configurations. The technical features in the above described embodiments corresponding to the technical features in the respective following configurations can be appropriately replaced or combined for solving part or all of the problems of the present disclosure or achieving part or all of the effects of the present disclosure. Further, the technical features not described as essential features in the specification can be appropriately deleted.

As below, the summary of the present disclosure will be appended.

APPENDIX 1

A display method according to an aspect of the present disclosure includes acquiring a first captured image by imaging a range containing a display surface using a camera, acquiring a second captured image by imaging the range containing the display surface using the camera after acquiring the first captured image, acquiring a first brightness value indicating brightness of a first bright point contained in the first captured image by a reflected light from a pointer for drawing on the display surface, and a first position indicating coordinates of the first bright point in the first captured image, acquiring a second brightness value indicating brightness of a second bright point contained in the second captured image by a reflected light from the pointer, and a second position indicating coordinates of the second bright point in the second captured image, displaying a first display image not containing a drawn image showing the line by the pointer on the display surface in a third position corresponding to the second position in an image displayed on the display surface when a first condition that the second brightness value is larger than the first brightness value by a first threshold or more and the second position is a position closer to the camera than the first position is satisfied, and displaying a second display image containing the drawn image in the third position on the display surface when the first condition is not satisfied.

The satisfaction of the first condition refers to a state in which the user is moving the pointer closer to the display surface for drawing a character or a figure. In the display method according to Appendix 1, when the first condition is satisfied, the first display image not containing the drawn image showing the drawn line by the pointer is displayed on the display surface, the touch by the pointer on the display surface may be accurately detected and display of an extra line connecting to the start point of the line drawn by the touch of the pointer on the display surface is avoided.

APPENDIX 2

A display method having a more preferable configuration is the display method according to Appendix 1 further including displaying the first display image on the display surface when a second condition that the first brightness value is larger than the second brightness value by a second threshold or more and the second position is a position farther from the camera than the first position is satisfied.

The satisfaction of the second condition refers to a state in which the user drawing a character or a figure using the pointer is moving the pointer farther from the display surface for ending the drawing. In the display method according to Appendix 2, when the second condition is satisfied, the first display image not containing the drawn image showing the drawn line by the pointer is displayed on the display surface, display of an extra line connecting to the end point of the line drawn by the touch of the pointer on the display surface is avoided.

APPENDIX 3

A display method having an even more preferable configuration is the display method according to Appendix 1 or Appendix 2 further including acquiring a reference position corresponding to a position of the camera in a panel coordinate system defining a position on a display panel of a display apparatus, wherein the displaying the first display image on the display surface includes displaying the first display image on the display surface by the display apparatus using the display panel, and the second position being the position closer to the camera than the first position refers to a state in which a distance from the reference position to the third position is shorter than a distance from the reference position to a fourth position corresponding to the first position in the panel coordinate system.

According to the display method described in Appendix 3, whether the first condition is satisfied can be determined based on the reference position corresponding to the position of the camera in the panel coordinate system, the fourth position corresponding to the first position in the panel coordinate system, and the third position corresponding to the second position in the panel coordinate system.

APPENDIX 4

A display method having an even more preferable configuration is the display method according to Appendix 1 or Appendix 2 further including acquiring a reference position corresponding to a position of the camera in a panel coordinate system defining a position on a display panel of a display apparatus, wherein the displaying the first display image on the display surface includes displaying the first display image on the display surface by the display apparatus using the display panel, and the second position being the position farther from the camera than the first position refers to a state in which a distance from the reference position to the third position is longer than a distance from the reference position to a fourth position corresponding to the first position in the panel coordinate system.

According to the display method described in Appendix 4, whether the second condition is satisfied can be determined based on the reference position corresponding to the position of the camera in the panel coordinate system, the fourth position corresponding to the first position in the panel coordinate system, and the third position corresponding to the second position in the panel coordinate system.

APPENDIX 5

A display method having an even more preferable configuration is the display method according to Appendix 3 or Appendix 4, wherein the acquiring the reference position includes displaying a pattern image on the display surface, acquiring a third captured image by imaging an area containing the pattern image using the camera, and acquiring the reference position by correlating a camera coordinate system defining a position on a captured image by the camera with the panel coordinate system based on the pattern image contained in the third captured image.

According to the display method described in Appendix 5, the reference position can be acquired based on the third captured image obtained by imaging of the display surface on which the pattern image is projected.

APPENDIX 6

A display system according to an aspect of the present disclosure includes a camera imaging a range containing a display surface, and a display apparatus executing acquiring a first captured image by imaging the range using the camera, acquiring a second captured image by imaging the range using the camera after acquiring the first captured image, acquiring a first brightness value indicating brightness of a first bright point contained in the first captured image by a reflected light from a pointer for drawing a line on the display surface, and a first position indicating coordinates of the first bright point in the first captured image, acquiring a second brightness value indicating brightness of a second bright point contained in the second captured image by a reflected light from the pointer, and a second position indicating coordinates of the second bright point in the second captured image, displaying a first display image not containing a drawn image showing the line by the pointer on the display surface in a third position corresponding to the second position in an image displayed on the display surface when a first condition that the second brightness value is larger than the first brightness value by a first threshold or more and the second position is a position closer to the camera than the first position is satisfied, and displaying a second display image containing the drawn image in the third position on the display surface when the first condition is not satisfied.

According to the display system described in Appendix 6, as is the case with the display method described in Appendix 1, when the first condition is satisfied, the first display image not containing the drawn image showing the drawn line by the pointer is displayed, the touch by the pointer on the display surface may be accurately detected and display of an extra line connecting to the start point of the line drawn by the touch of the pointer on the display surface is avoided.

What is claimed is:
1. A display method comprising:
acquiring a first captured image by using a camera imaging a range containing a display surface;
acquiring a second captured image by imaging the range containing the display surface using the camera after acquiring the first captured image;
acquiring a first brightness value indicating brightness of a first bright point contained in the first captured image by a reflected light from a pointer for drawing a line on the display surface, and a first position indicating coordinates of the first bright point in the first captured image;
acquiring a second brightness value indicating brightness of a second bright point contained in the second captured image by a reflected light from the pointer, and a second position indicating coordinates of the second bright point in the second captured image;
displaying a first display image not containing a drawn image showing the line by the pointer on the display surface in a third position corresponding to the second position in an image displayed on the display surface when a first condition that the second brightness value is larger than the first brightness value by a first threshold or more and the second position is a position closer to the camera than the first position is satisfied; and
displaying a second display image containing the drawn image in the third position on the display surface when the first condition is not satisfied.

2. The display method according to claim 1, further comprising displaying the first display image on the display surface when a second condition that the first brightness value is larger than the second brightness value by a second threshold or more and the second position is a position farther from the camera than the first position is satisfied.

3. The display method according to claim 2, further comprising acquiring a reference position corresponding to a position of the camera in a panel coordinate system defining a position on a display panel of a display apparatus, wherein
the displaying the first display image on the display surface includes displaying the first display image on the display surface by the display apparatus using the display panel, and
the second position being the position farther from the camera than the first position refers to a state in which a distance from the reference position to the third position is longer than a distance from the reference position to a fourth position corresponding to the first position in the panel coordinate system.

4. The display method according to claim 1, further comprising acquiring a reference position corresponding to a position of the camera in a panel coordinate system defining a position on a display panel of a display apparatus, wherein
- the displaying the first display image on the display surface includes displaying the first display image on the display surface by the display apparatus using the display panel, and
- the second position being the position closer to the camera than the first position refers to a state in which a distance from the reference position to the third position is shorter than a distance from the reference position to a fourth position corresponding to the first position in the panel coordinate system.

5. The display method according to claim 4, wherein the acquiring the reference position includes:
displaying a pattern image on the display surface;
acquiring a third captured image by imaging an area containing the pattern image using the camera; and
acquiring the reference position by correlating a camera coordinate system defining a position on a captured image by the camera with the panel coordinate system based on the pattern image contained in the third captured image.

6. A display system comprising:
a camera imaging a range containing a display surface; and
a display apparatus executing
- acquiring a first captured image by imaging the range using the camera,
- acquiring a second captured image by imaging the range using the camera after acquiring the first captured image,
- acquiring a first brightness value indicating brightness of a first bright point contained in the first captured image by a reflected light from a pointer for drawing a line on the display surface, and a first position indicating coordinates of the first bright point in the first captured image,
- acquiring a second brightness value indicating brightness of a second bright point contained in the second captured image by a reflected light from the pointer, and a second position indicating coordinates of the second bright point in the second captured image,
- displaying a first display image not containing a drawn image showing the line by the pointer on the display surface in a third position corresponding to the second position in an image displayed on the display surface when a first condition that the second brightness value is larger than the first brightness value by a first threshold or more and the second position is a position closer to the camera than the first position is satisfied, and
- displaying a second display image containing the drawn image in the third position on the display surface when the first condition is not satisfied.

* * * * *